(12) United States Patent
Nitta

(10) Patent No.: US 11,785,411 B2
(45) Date of Patent: Oct. 10, 2023

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventor: Kei Nitta, Tokyo (JP)

(73) Assignee: SONY CORPORATION, Tokyo (JM)

( * ) Notice: Subject to any disclaimer, the term of this patent is extended or adjusted under 35 U.S.C. 154(b) by 0 days.

(21) Appl. No.: 17/250,521

(22) PCT Filed: Jun. 6, 2019

(86) PCT No.: PCT/JP2019/022523
§ 371 (c)(1),
(2) Date: Jan. 31, 2021

(87) PCT Pub. No.: WO2020/031486
PCT Pub. Date: Feb. 13, 2020

(65) Prior Publication Data
US 2021/0297805 A1 Sep. 23, 2021

(30) Foreign Application Priority Data

Aug. 8, 2018 (JP) .................................. 2018-149365

(51) Int. Cl.
*H04S 7/00* (2006.01)
*G06T 7/70* (2017.01)
*G06V 40/19* (2022.01)

(52) U.S. Cl.
CPC ................ *H04S 7/304* (2013.01); *G06T 7/70* (2017.01); *G06V 40/19* (2022.01); *H04S 2400/11* (2013.01); *H04S 2420/01* (2013.01)

(58) Field of Classification Search
CPC ...... H04S 7/302; H04S 2420/01; H04S 7/304; H04S 7/00; G06F 3/012; G06V 40/19; G06T 7/70

(Continued)

(56) References Cited

U.S. PATENT DOCUMENTS 10,412,530 B2 * 9/2019 Konishi ................. H04S 7/304
2015/0304790 A1 * 10/2015 Yamashita .............. G06F 21/32
381/303

(Continued)

FOREIGN PATENT DOCUMENTS

CN 103869968 A 6/2014
JP 2010-056589 A 3/2010

(Continued)

OTHER PUBLICATIONS

International Search Report and Written Opinion of PCT Application No. PCT/JP2019/022523, dated Jul. 9, 2019, 08 pages of ISRWO.

*Primary Examiner* — Yosef K Laekemariam
(74) *Attorney, Agent, or Firm* — CHIP LAW GROUP

(57) ABSTRACT

Provided is an information processing apparatus that includes an output processing unit, a recognized-position acquisition unit, and a comparing unit. The output processing unit generates a sound by using a head-related transfer function of a user measured in advance, the sound being to be output from a virtual sound source located at a first position in a space around the user. The recognized-position acquisition unit acquires information of a second position in the space, the second position being recognized as a position of the virtual sound source by the user who has listened to the sound. The comparing unit compares the first position and the second position with each other. The output processing unit controls the position of the virtual sound source of the sound output toward the user on the basis of a result of the comparison by the comparing unit.

16 Claims, 7 Drawing Sheets

(58) Field of Classification Search
USPC .............................. 381/17, 85, 300, 303, 310
See application file for complete search history.

(56) References Cited

U.S. PATENT DOCUMENTS

2017/0201847 A1* 7/2017 Fujita ........................ H04S 7/00
2018/0176709 A1   6/2018 Konishi et al.

FOREIGN PATENT DOCUMENTS

| JP | 2014-116722 A | 6/2014 | |
| KR | 20070119327 | * 12/2007 | .............. G01S 3/80 |
| WO | 2014/087558 A1 | 6/2014 | |
| WO | 2017/029793 A1 | 2/2017 | |

* cited by examiner

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2019/022523 filed on Jun. 6, 2019, which claims priority benefit of Japanese Patent Application No. JP 2018-149365 filed in the Japan Patent Office on Aug. 8, 2018. Each of the above-referenced applications is hereby incorporated herein by reference in its entirety.

TECHNICAL FIELD

The present technology relates to an information processing apparatus, an information processing method, a program, and an information processing system that are related to sound image localization processing.

BACKGROUND ART

Patent Document 1 discloses that sound image localization processing is performed using a head-related transfer function in a headphone, a head-mounted display, or the like.

The head-related transfer function is a function that depends on the shape of the head, the shape of the auricle, the shape of the external auditory canal, and the like of a user U and that differs depending on the user U. So, when a sound output apparatus such as a headphone or a head-mounted display is used, the head-related transfer function of the user U who will wear a sound processing apparatus is obtained.

The head-related transfer function is measured at the initial setting for the use of the sound output apparatus. Usually, the measurement is performed in the following manner: the user U wearing the sound output apparatus listens to sounds from a large number of sound sources, for example, approximately 40 sound sources in a stereophonic sound space and points to a direction in which each sound comes from each sound source.

CITATION LIST

Patent Literature

Patent Literature 1: Japanese Patent Application Laid-open No. 2010-56589

DISCLOSURE OF INVENTION

Technical Problem

After the measurement of the head-related transfer function, when the user removes the sound output apparatus and wears the sound output apparatus again, a wearing deviation from the worn state at the time of measurement of the head-related transfer function may occur. When such a wearing deviation occurs and when the user listens to a sound from a virtual sound source located at a first position, which is output on the basis of the measured head-related transfer function, the position of the virtual sound source recognized by the user is not the first position in some cases. In such a case, the output sound may be perceived as a sound from a virtual sound source at a position unnatural for the user.

In order to prevent such a problem, the head-related transfer function can be measured again if the user listens to approximately 40 sound sources, but it takes time and labor.

In view of the above circumstances, it is an object of the present technology to provide an information processing apparatus, an information processing method, a program, and an information processing system that are capable of easily performing calibration of sound image localization processing.

Solution to Problem

In order to achieve the above object, an information processing apparatus according to an embodiment of the present technology includes an output processing unit, a recognized-position acquisition unit, and a comparing unit.

The output processing unit generates a sound by using a head-related transfer function of a user measured in advance, the sound being to be output from a virtual sound source located at a first position in a space around the user.

The recognized-position acquisition unit acquires information of a second position in the space, the second position being recognized as a position of the virtual sound source by the user who has listened to the sound.

The comparing unit compares the first position and the second position with each other.

The output processing unit controls the position of the virtual sound source of the sound output toward the user on the basis of a result of the comparison by the comparing unit.

According to such a configuration, since the position of the virtual sound source of the output sound is controlled on the basis of the result of the comparison between the first position and the second position, the calibration of the sound image localization processing can be easily performed without remeasuring the head-related transfer function.

The output processing unit may generate, using the head-related transfer function, a plurality of sounds to be output from a plurality of the virtual sound sources located at a plurality of the first positions having coordinate positions different from each other, and the recognized-position acquisition unit may acquire information of a plurality of the second positions recognized as positions of the virtual sound sources of the respective sounds by the user who has listened to the plurality of sounds.

This improves the accuracy of the calibration.

The virtual sound source may be a moving sound source.

This improves the accuracy of the calibration. Further, the time used for the calibration can be shortened.

The information processing apparatus may further include an output parameter calculation unit that calculates an output parameter of the sound output toward the user on the basis of the result of the comparison by the comparing unit, and the output processing unit may control the position of the virtual sound source of the sound output toward the user in accordance with the output parameter calculated by the output parameter calculation unit.

The output parameter calculation unit may calculate the output parameter to correct a deviation between the first position and the second position.

The sound controlled by the output processing unit may be supplied to a sound output unit of a sound output apparatus, the sound output unit being located in a vicinity of an ear of the user when the sound output apparatus is worn by the user.

As a result, even if the user wears the sound output apparatus with a deviation from the wearing position at the time of measurement of the head-related transfer function, easy calibration is made possible, so that the sound from the virtual sound source position natural for the user can be provided to the user without remeasuring the head-related transfer function.

The sound output apparatus may include a sensor unit that detects information regarding the user and surroundings of the user, and the recognized-position acquisition unit may acquire information of the second position by using sensor information from the sensor unit.

The sensor unit may include a first imaging unit that captures an image of the surroundings of the user, and the recognized-position acquisition unit may acquire the information of the second position by using a captured image captured by the first imaging unit and showing a state in which the user points to the second position.

In such a manner, the information of the second position can be acquired using the captured image obtained by imaging the surroundings of the user.

The sensor unit may include a second imaging unit that captures an image of an eye of the user, and the recognized-position acquisition unit may acquire the information of the second position by using a captured image captured by the second imaging unit and showing a state in which the user gazes at the second position.

According to such a configuration, it is possible to acquire the line-of-sight direction in which the user gazes at the second position from the captured image captured by the second imaging unit, and to obtain the information of the second position from the line-of-sight direction.

The information processing apparatus may further include a posture acquisition unit that acquires posture information of the sound output apparatus by using the sensor information from the sensor unit, in which whether or not control of the position of the virtual sound source of the sound based on the result of the comparison is to be executed is determined on the basis of the posture information.

Thus, the presence or absence of a wearing deviation of the sound output apparatus is detected from the posture information of the sound output apparatus, and on the basis of a result of the detection, it may be determined whether or not the control of the position of the virtual sound source of the sound based on the result of the comparison is performed, i.e., whether or not a series of processing related to the calibration processing is performed.

The recognized-position acquisition unit may acquire information of the second position by using a captured image captured by an external sensor different from the sound output apparatus and showing a state in which the user points to the second position.

In such a manner, the information of the second position may be acquired using the captured image, which is captured by the external sensor and shows the surroundings of the user including the user.

The recognized-position acquisition unit may acquire the information of the second position by using a captured image captured by the external sensor and showing a device to be gripped by the user.

According to such a configuration, the information of the second position can be acquired by detecting the region of the device shown in the captured image captured by the external sensor.

The recognized-position acquisition unit may acquire information of the second position by using a positioning result of a device including a positioning unit to be gripped by the user.

The output parameter calculation unit may calculate the output parameter on the basis of a result of selecting the first position or the second position for the virtual sound source selected by the user.

According to such a configuration, the user can select whether the sound is the sound before the calibration or the sound after the calibration.

In order to achieve the above object, an information processing method according to an embodiment of the present technology include: generating a sound by using a head-related transfer function of a user measured in advance, the sound being to be output from a virtual sound source located at a first position in a space around the user; acquiring information of a second position in the space, the second position being recognized as a position of the virtual sound source by the user who has listened to the sound; comparing the first position and the second position with each other; and controlling the position of the virtual sound source of the sound output toward the user on the basis of a result of the comparison.

In order to achieve the above object, a program according to an embodiment of the present technology causes an information processing apparatus to execute processing including: generating a sound by using a head-related transfer function of a user measured in advance, the sound being to be output from a virtual sound source located at a first position in a space around the user; acquiring information of a second position in the space, the second position being recognized as a position of the virtual sound source by the user who has listened to the sound; comparing the first position and the second position with each other; and controlling the position of the virtual sound source of the sound output toward the user on the basis of a result of the comparison.

In order to achieve the above object, an information processing system according to an embodiment of the present technology includes an output processing unit, a recognized-position acquisition unit, a comparing unit, and a sound output unit.

The output processing unit generates a sound by using a head-related transfer function of a user measured in advance, the sound being to be output from a virtual sound source located at a first position in a space around the user.

The recognized-position acquisition unit acquires information of a second position in the space, the second position being recognized as a position of the virtual sound source by the user who has listened to the sound.

The comparing unit compares the first position and the second position with each other.

The sound output unit outputs the sound controlled by the output processing unit toward the user.

The output processing unit controls the position of the virtual sound source of the sound output toward the user on the basis of a result of the comparison by the comparing unit.

Advantageous Effects of Invention

As described above, according to the present technology, it is possible to easily perform calibration of the sound image localization processing. Note that the effects described herein are not necessarily limited, and may be any of the effects described in the present disclosure.

MODE(S) FOR CARRYING OUT THE INVENTION

First Embodiment

Overview

Figure 1:
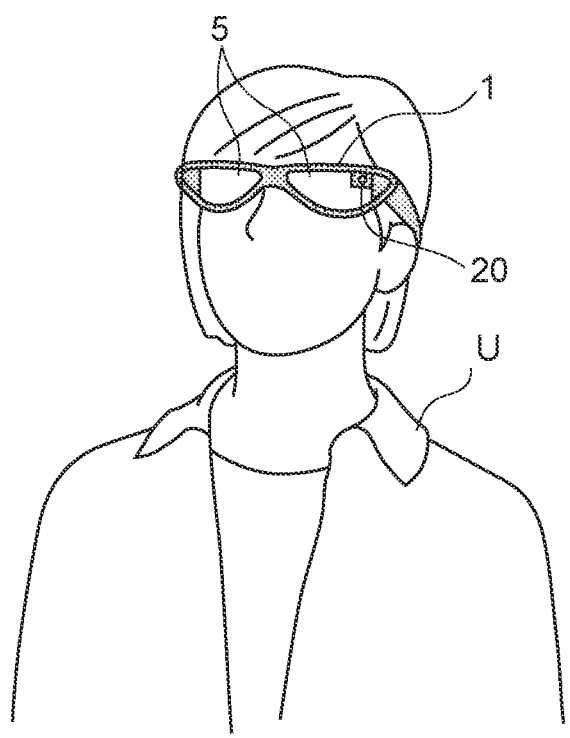
FIG. 1 is a diagram for describing an outline of an information processing apparatus according to a first embodiment of the present technology.

The outline of an information processing apparatus according to an embodiment of the present technology will be described with reference to FIG. 1. FIG. 1 is a diagram for describing the outline of an information processing apparatus.

As shown in FIG. 1, the information processing apparatus according to this embodiment is achieved by, for example, a glasses-type head-mounted display (HMD) 1 mounted on the head of a user U. A display unit 5 corresponding to the eyeglass lens portion positioned in front of the eyes of the user U when mounted may be of a see-through type or a non-see-through type.

By displaying a display object on the display unit 5, the HMD 1 can present the display object in front of the line of sight of the user U.

Examples of the HMD include a see-through HMD, a video see-through HMD, and a retinal projection HMD. In those HMDs, an image in which an image of a virtual object is superimposed on an optical image of a real object located in a real space is controlled to be displayable by a display image controller of the HMD on the basis of the augmented reality (AR) technology.

Note that the shape of the information processing apparatus is not limited to the example shown in FIG. 1. For example, the information processing apparatus may be a headband-type HMD (which is a type worn by a band around the entire circumference of the head, or may include a band passing through the top of the head as well as the temporal region of the head) or a helmet-type HMD (in which the visor portion of the helmet corresponds to the display).

The outline of a calibration method for the sound image localization processing in this embodiment will be described with reference to FIGS. 3 and 4.

Figure 3:
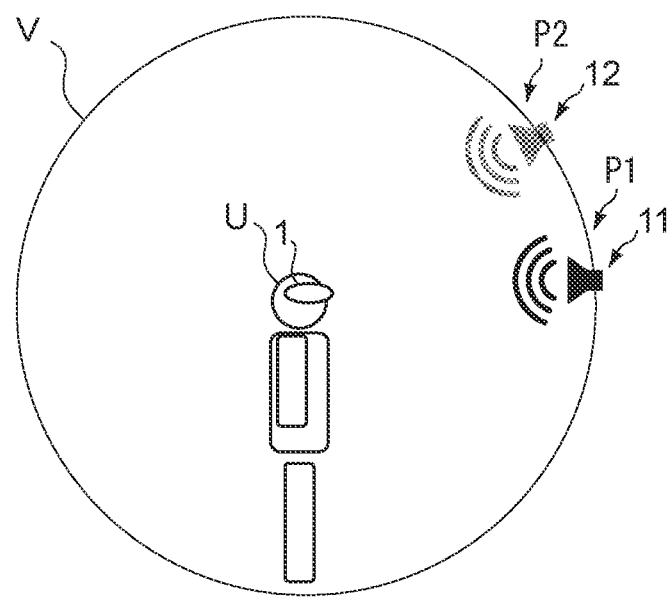
FIG. 3 is a diagram (Part 1) for describing a calibration method for sound image localization processing of the information processing apparatus.
Figure 4:
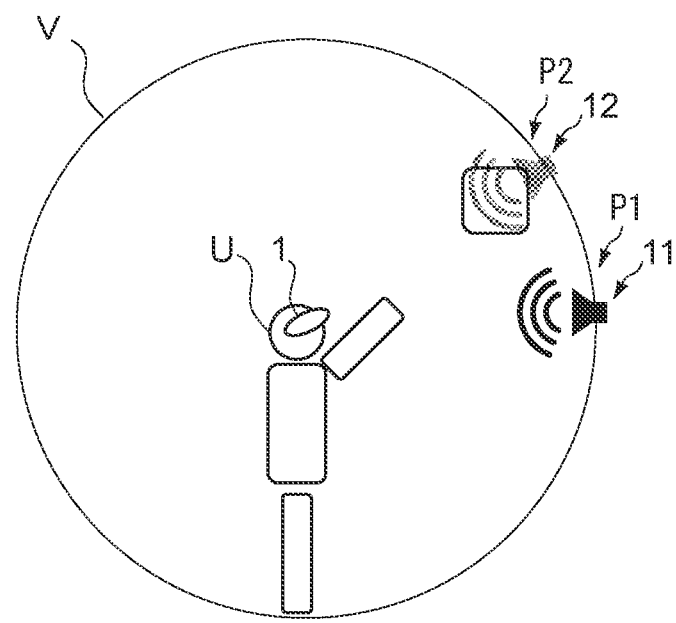
FIG. 4 is a diagram (Part 2) for describing a calibration method for the sound image localization processing of the information processing apparatus.

FIGS. 3 and 4 are diagrams for describing a calibration method for the sound image localization processing of the HMD 1.

FIG. 3 is a diagram showing a state in which the user U wearing the HMD 1 listens to a sound output from a virtual sound source in a stereophonic sound space V.

FIG. 4 is a diagram showing a state in which the user U wearing the HMD 1 listens to the sound output from the virtual sound source in the stereophonic sound space V and points to the position of a recognized virtual sound source 12 recognized as the sound source.

In this embodiment, the presentation of the position of the recognized virtual sound source 12 by the user U will be described by taking an example in which the user U points to the position of the recognized virtual sound source 12 with the user's finger while lifting the arm.

The stereophonic sound space V is a virtual space recognized as a space around the user U as a listener.

The HMD 1 serving as a sound output apparatus includes a speaker 6 as a sound output unit to be described later. In this embodiment, as shown in FIG. 3, a sound output from a virtual sound source 11 at a first position P1 of the stereophonic sound space V, in which the sound image localization processing is performed using the head-related transfer function of the user U that has been measured in advance, is output through the speaker 6.

Here, when there is no deviation between the wearing position of the HMD 1 at the time of measuring the head-related transfer function and the wearing position at the time when the user U wears the HMD 1 again, the user U recognizes the sound source position of the sound outputted from the virtual sound source 11 at the first position P1 as the first position P1.

On the other hand, when there is a wearing deviation or when the accuracy in measurement of the head-related transfer function is insufficient, the position of the virtual sound source of the sound output toward the user U at the time of re-wearing is not recognized as being at the first position P1 in some cases.

When there is a wearing deviation, for example, as shown in FIG. 4, the user U who has listened to the sound from the virtual sound source 11 at the first position P1 recognizes that the sound source is at a second position P2 different from the first position P1. The user U points to the recognized virtual sound source 12 at the second position P2 recognized as the sound source with a finger.

In the HMD 1, the sound image localization processing of the sound output toward the user U is calibrated on the basis of the result of comparing the second position recognized as the sound source by the user U and the first position. Specifically, the position of the virtual sound source is corrected so as to be recognized by the user U as a sound output from the virtual sound source at the first position P1 when the user U listens to the sound. Details will be described later.

(Configuration of Information Processing System)

Figure 2:
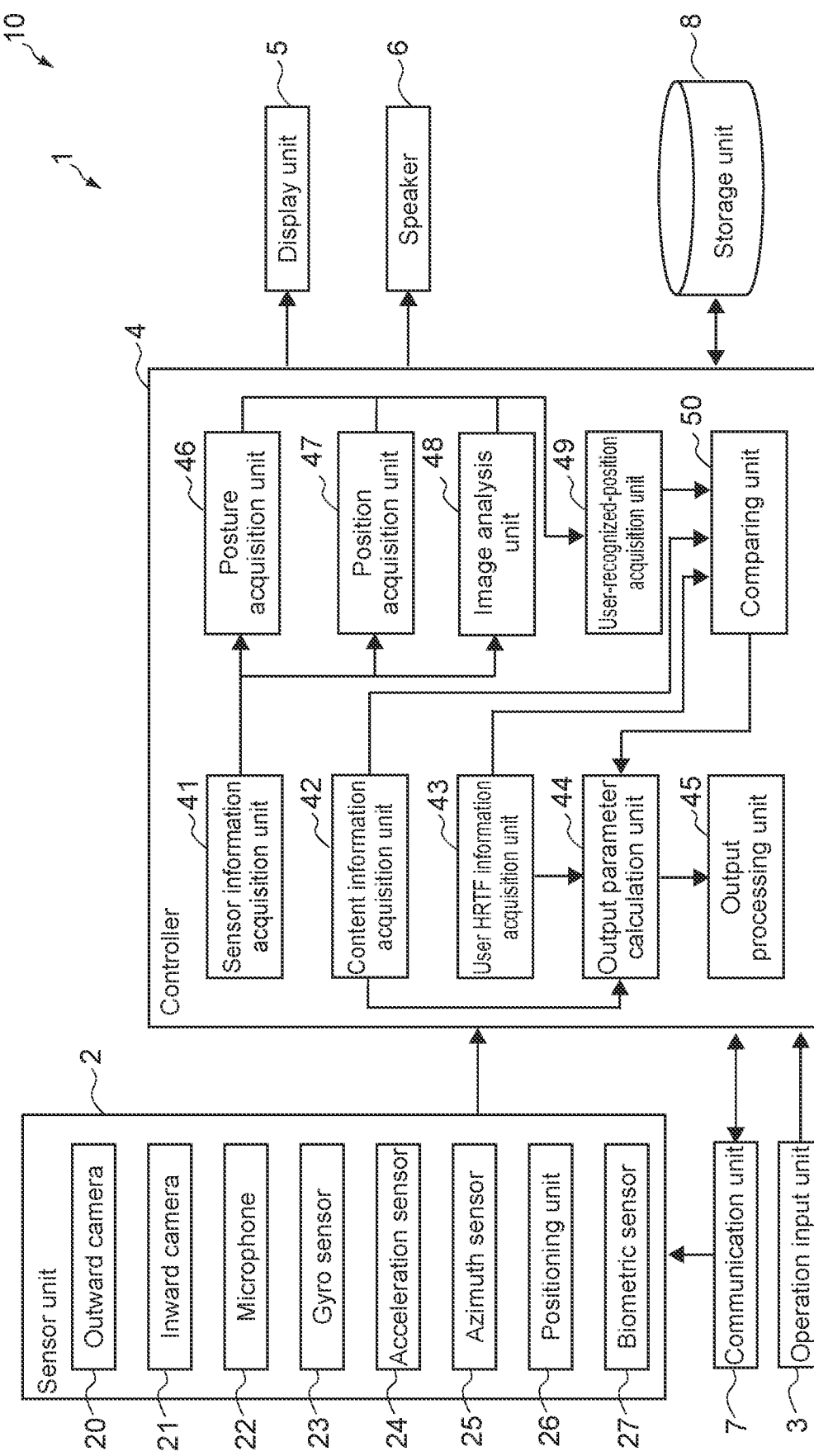
FIG. 2 is a block diagram showing an information processing system and an example of a configuration of the information processing apparatus according to the first embodiment.

FIG. 2 is a block diagram showing an example of a configuration of the information processing system and the HMD.

The information processing system 10 includes a controller 4, a sensor unit 2, and a speaker 6 serving as a sound output unit.

In this embodiment, the sensor unit 2 and the speaker 6 are mounted in the HMD 1 serving as a sound output apparatus.

The speaker 6 is positioned near the ear of the user U when the user U wears the HMD 1.

The controller 4 may be provided in the HMD or may be provided in another apparatus such as a cloud server or a mobile terminal configured to be communicable with the HMD. When the controller 4 is disposed in an apparatus different from the HMD, the apparatus becomes an information processing apparatus.

In this embodiment, an example in which the controller 4 is mounted in the HMD 1 will be described, and the HMD 1 will be described below in detail with reference to FIG. 2. In this embodiment, the HMD 1 is a sound output apparatus and is also an information processing apparatus that performs a series of processing related to calibration of sound image localization processing.

(Configuration of HMD)

As shown in FIG. 2, the HMD 1 includes the sensor unit 2, an operation input unit 3, the controller 4, a display unit 5, the speaker 6, a communication unit 7, and a storage unit 8.

The sensor unit 2 has a function of acquiring information regarding the user U and the surroundings of the user U.

The sensor unit 2 has various sensors. For example, the sensor unit 2 includes an outward camera 20 as a first imaging unit, an inward camera 21 as a second imaging unit, a microphone 22, a gyro sensor 23, an acceleration sensor 24, an azimuth sensor 25, a positioning unit 26, and a biometric sensor 27. Sensor information detected by each sensor is output to the controller 4.

Each of the outward camera 20 and the inward camera 21 includes a lens system including an imaging lens, a diaphragm, a zoom lens, a focus lens, and the like, a drive system for causing the lens system to perform a focus operation or a zoom operation, a solid-state imaging device array for photoelectrically converting the imaging light obtained by the lens system and generating an imaging signal, and the like. The solid-state imaging device array may be achieved by, for example, a charge coupled device (CCD) sensor array or a complementary metal oxide semiconductor (CMOS) sensor array.

The outward camera 20 images the surroundings of the user U.

The inward camera 21 images the eyes of the user U.

In this embodiment, a plurality of outward cameras 20 and a plurality of inward cameras 21 are provided. Providing the plurality of outward cameras 20 allows a distance image to be obtained by parallax information.

The microphone 22 collects the voice of the user U and surrounding environmental sounds and outputs the collected voice and sounds as sound data to the controller 4.

The gyro sensor 23 is achieved by, for example, a triaxial gyro sensor and detects an angular velocity (rotational speed).

The acceleration sensor 24 is achieved by, for example, a triaxial acceleration sensor and detects an acceleration at the time of movement.

The azimuth sensor 25 is achieved by, for example, a triaxial geomagnetic sensor (compass) and detects the absolute direction (azimuth direction).

The positioning unit 26 has a function of detecting the current position of the HMD 1 on the basis of a signal obtained from the outside via the communication unit 7 to be described later. For example, the positioning unit 26 is achieved by a global position system (GPS) positioning unit, and receives the radio waves from GPS satellites, detects the position where the HMD 1 is present, and outputs the detected position information to the controller 4.

In addition to the GPS, the positioning unit 26 may detect the position by, for example, transmission/reception with Wi-Fi (registered trademark), Bluetooth (registered trademark), a cellular phone, a smart phone, or the like, or short-distance communication.

The biometric sensor 27 acquires biometric information of the user U. For example, as the biometric sensor 27, a temperature sensor capable of measuring the body temperature, a heart rate sensor capable of measuring the heart rate, a sweat sensor capable of measuring the sweating amount, or the like is provided.

The operation input unit 3 is achieved by an operation member having a physical structure such as a switch, a button, or a lever.

The display unit 5 is achieved by, for example, a lens unit for performing display using the hologram optical technology (an example of a transmissive display unit), a liquid crystal display device, an organic light emitting diode (OLED) device, or the like. Further, the display unit 5 may be transmissive, semi-transmissive, or non-transmissive.

The speaker 6 outputs a sound under the control of the controller 4.

The communication unit 7 is a communication module for transmitting and receiving data to and from other apparatuses by a wired or wireless manner. The communication unit 7 wirelessly communicates with an external apparatus directly or via a network access point by, for example, methods such as a wired local area network (LAN), a wireless LAN, Wi-Fi, infrared communication, Bluetooth, short-distance/contactless communication, and the like.

The storage unit 8 stores a program for the controller 4 to execute each function.

The programs stored in the storage unit 8 are for causing the HMD 1, which is an information processing apparatus, to execute processing including the steps of: controlling sound output from a virtual sound source at a first position in a space around the user toward the user by using a head-related transfer function of the user measured in advance; obtaining information of a second position in the space recognized as a position of the virtual sound source by the user who listened to the sound; comparing the first position with the second position; and controlling the position of the virtual sound source of the sound output toward the user on the basis of a result of the comparison.

The storage unit 8 stores in advance head-related transfer functions of the user U at a plurality of sound source positions. The head-related transfer functions are measured in advance for the user U who will use the HMD 1.

The storage unit 8 stores video content and sound content as content information. The sound content includes sound image data.

The sound image data includes information that defines for which position in the space the virtual sound source is to be set. The sound image data includes information in which first positions having mutually different coordinate positions are associated with data related to the sounds output from the virtual sound sources at the first positions.

The coordinates of the first position P1 can be the output coordinates of the sound content. The coordinates of the second position P2 can be perceptual coordinates of the user.

The controller 4 controls processing related to generating of the sound from the virtual sound source to be output toward the user U. More specifically, the controller 4 controls processing related to the calibration of the sound image localization processing so as to correct the deviation between the position (first position) of the virtual sound source presented by the information processing system 10 and the position (second position) of the virtual sound source recognized by the user U, which is caused by the wearing deviation or the like of the HMD 1.

The controller 4 includes a sensor information acquisition unit 41, a content information acquisition unit 42, a user head-related transfer function (HRTF) information acquisition unit 43, an output parameter calculation unit 44, an output processing unit 45, a posture acquisition unit 46, a position acquisition unit 47, an image analysis unit 48, a user-recognized-position acquisition unit 49, and a comparing unit 50.

The content information acquisition unit 42 acquires the video content and the sound content from the storage unit 8. Further, the content information acquisition unit 42 may acquire digital content such as video content and sound content input via the communication unit 7. Description of video data generation processing will be omitted below.

The sensor information acquisition unit 41 acquires various types of sensor information sensed by the sensors of the sensor unit 2.

The posture acquisition unit 46 acquires the posture of the HMD 1 and the posture of the head of the user U as well by using the sensor information acquired by the sensor information acquisition unit 41.

For example, the posture acquisition unit 46 analyzes at least one of the captured image of the surroundings captured by the outward camera 20, the gyro information acquired by the gyro sensor 23, the acceleration information acquired by the acceleration sensor 24, or the azimuth information acquired by the azimuth sensor 25 to recognize the posture of the HMD 1 such as the direction or inclination.

The position acquisition unit 47 acquires the position information of the user U, and more particularly, the position information of the HMD 1 measured by the positioning unit 26 (the position information of the user U) by using the sensor information acquired by the sensor information acquisition unit 41.

The image analysis unit 48 analyzes the captured image that is the sensor information acquired by the sensor information acquisition unit 41. The image analysis unit 48 analyzes the captured image of the surroundings captured by the outward camera 20 and detects a hand region of the user U by a well-known hand region detection technique. Furthermore, the image analysis unit 48 analyzes the captured image of the surroundings captured by the outward camera 20 and acquires distance information of the hand region and a planar position of the hand region.

The image analysis unit 48 specifies the line of sight of the user U from the captured images of the user's eyes captured by the inward camera 21.

For example, each of the right and left eyes of the user U is irradiated with infrared light from an infrared LED (not shown), the right and left eyes of the user U are imaged by the inward camera 21, and the captured images are analyzed, to specify the position of reflection of the infrared light on the cornea and the position of the pupil and specify the line of sight of the user U from such a positional relationship.

Note that the method of detecting the line of sight is not limited to this, and a general technique such as a technique of imaging the right and left eyes with an inward camera and specifying the line of sight from a positional relationship between the inner corner of the eye and the iris may be adopted.

The user HRTF information acquisition unit 43 acquires the head-related transfer function of the user U stored in advance in the storage unit 8.

The output parameter calculation unit 44 calculates an output parameter of the sound to be output from the virtual sound source 11 at the first position P1 in the stereophonic sound space V toward the user U by using the sound content acquired by the content information acquisition unit 42 and the head-related transfer function acquired by the user HRTF information acquisition unit 43.

Further, the output parameter calculation unit 44 calculates an output parameter of the sound to be output using the sound content acquired by the content information acquisition unit 42, the head-related transfer function acquired by the user HRTF information acquisition unit 43, and a result of the comparison by the comparing unit 50, which will be described later.

Specifically, if the amount of deviation (offset value) between the first position P1 and the second position P2 calculated by the comparing unit 50 is equal to or larger than a threshold value, the output parameter calculation unit 44 calculates an output parameter (hereinafter, also referred to as a correction output parameter) so as to correct the positional deviation by using the sound content, the head-related transfer function, and the offset value in order to perform calibration.

On the other hand, if the amount of deviation between the first position and the second position is lower than the threshold value, the calibration is not performed. The output parameter calculation unit 44 calculates an output parameter of the sound to be output from the virtual sound source 11 at the first position P1 by using the sound content and the head-related transfer function.

The output processing unit 45 generates a sound to be output toward the user U in accordance with the output parameter calculated by the output parameter calculation unit 44. The sound generated by the output processing unit 45 is output toward the user U through the speaker 6.

The user-recognized-position acquisition unit 49 acquires relative position information between the HMD 1 and the hand region of the user U from the distance information of the hand region of the user U and the planar position of the hand region, which are acquired by the image analysis unit 48.

In addition, the user-recognized-position acquisition unit 49 acquires the spherical coordinates of the hand region from the relative position information between the HMD 1 and the hand region of the user U and the position information of the HMD 1 acquired by the position acquisition unit 47. The spherical coordinates of the hand region includes the information of the second position P2, and specifically, the information on the direction of the second position P2 at which the recognized virtual sound source 12 is located when seen from the HMD 1 (the user U).

The comparing unit 50 compares the first position P1 of the virtual sound source 11 presented by the information processing system 10 with the second position P2 of the recognized virtual sound source 12 recognized by the user U and acquired by the user-recognized-position acquisition unit 49, and calculates the amount of deviation (offset value) between the first position P1 and the second position P2.

Here, the sound source in the stereophonic sound space will be described with reference to FIG. 6.

Figure 6:
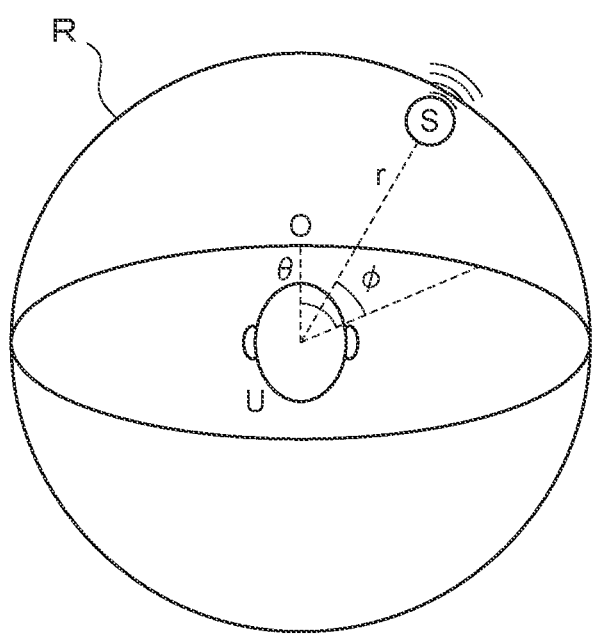
FIG. 6 is a diagram for describing a position of a sound source in a stereophonic sound space.

As shown in FIG. 6, a stereophonic sound space R is a space around the user U who is the listener, and a sound source S exists therein. The position of the sound source S is expressed using a radius r and declinations $\theta$ and $\varphi$ in a spherical coordinate system with the position of the user U being as the origin.

The position of the user is precisely the midpoint of the line segment connecting the right and left ears of the user when the user U faces the front direction. The radius r is the distance from the midpoint to the position of the sound source S. The declination θ is an angle formed by the front direction of the user U and the direction of the sound source S in the horizontal plane. The declination φ is an angle formed by the horizontal plane including the position of the user U and the direction of the sound source S in the vertical plane.

Here, in the sound wave reaching the tympanic membrane of the user U (hereinafter, also referred to as listening sound), a specific frequency component of the sound wave (hereinafter, also referred to as original sound) radiated from the sound source S is emphasized or attenuated due to reflection and diffraction on the head and the ears of the user U. The head-related transfer function (HRTF) expresses the change from the original sound to the listening sound at that time as a transfer function.

The brain, which is the sensory center of the user U, recognizes the relationship between the spherical coordinates (r, θ, φ) of the position of the sound source S and the head-related transfer function as an empirical rule.

Therefore, previously obtaining the head-related transfer functions of the user U in a plurality of sound sources at coordinate positions different from each other makes it possible to output the sound from the virtual sound source toward the user U by using the head-related transfer functions.

The storage unit 8 stores the head-related transfer functions of the user U, which are measured in advance for each sound source at a plurality of spherical coordinates (r, θ, φ) different from each other in the real sound space.

Outputting the sound content in the HMD 1 is performed by using the previously measured head-related transfer functions stored in the storage unit 8.

In this embodiment, the spherical coordinates of the first position P1 of the virtual sound source 11 of the sound output using the head-related transfer function measured in advance are represented as ($r_1$, $θ_1$, $φ_1$). Further, the spherical coordinates of the second position P2 of the recognized virtual sound source 12 are represented as ($r_2$, $θ_2$, $φ_2$).

The sound from the virtual sound source 11 is output on the basis of the information stored in the storage unit 8, and information of the spherical coordinates ($r_1$, $θ_1$, $φ_1$) of the first position P1 is stored in the storage unit 8.

As described above, the spherical coordinates of the hand region of the user U acquired by the user-recognized-position acquisition unit 49 include information on the direction of the second position P2 at which the recognized virtual sound source 12 is located when seen from the HMD 1 (the user U).

That is, the declination θ and the declination φ of the spherical coordinates, which indicate the position of the hand region of the user U when the user U faces in the front direction and when the midpoint of the line segment connecting the right and left ears of the user U is taken as the origin, are equal to the declination $θ_2$ and the declination $φ_2$ of the spherical coordinates indicating the second position P2 at which the recognized virtual sound source 12 is located.

Therefore, it is possible to obtain the declination $θ_2$ and the declination $φ_2$ of the spherical coordinates indicating the second position P at which the recognized virtual sound source 12 is located, from the spherical coordinates of the hand region of the user U acquired by the user-recognized-position acquisition unit 49.

Figure 7:
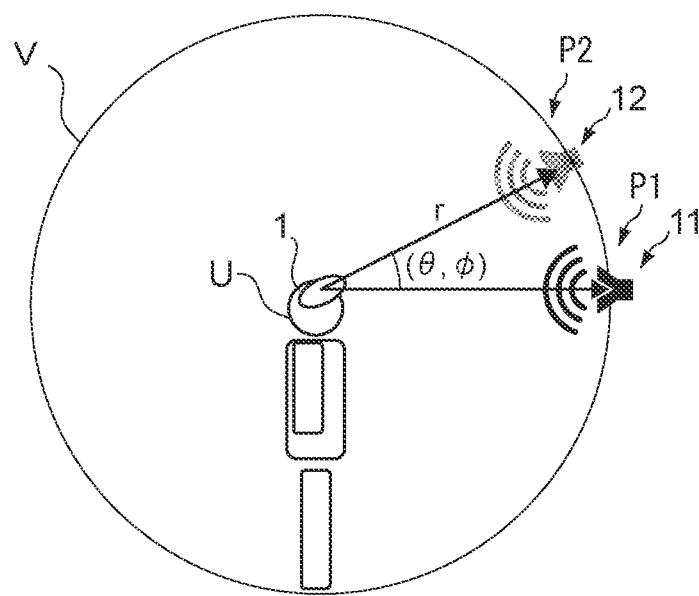
FIG. 7 is a diagram for describing a calibration method for the sound image localization processing of the information processing apparatus and is a diagram for describing the calculation of the amount of deviation between a first position and a second position.

FIG. 7 is a diagram for describing calculation of the amount of deviation between the first position and the second position.

As shown in FIG. 7, the amount of deviation (offset value) between the first position P1 and the second position P2 calculated by the comparing unit 50 described above does not include the amount of deviation in the radial r and includes the deviations in the two angular coordinate systems, the deviation in the declination θ and the deviation in the declination φ.

In the output parameter calculation unit 44, if the offset value is equal to or larger than the threshold value, a correction output parameter is calculated so as to correct the deviation of the coordinate of at least one of the angular coordinate systems of the declination θ and the declination φ. In the output processing unit 45, the sound to be output according to the calculated correction output parameter is generated. Thus, in the output processing unit 45, the position of the virtual sound source of the sound to be output is controlled on the basis of a result of the comparison by the comparing unit 50, and thus calibration of the sound to be output is performed.

On the other hand, if the offset value is lower than the threshold value, calibration is not performed.

(Information Processing Method)

Next, an information processing method related to the calibration will be described with reference to FIG. 5.

Figure 5:
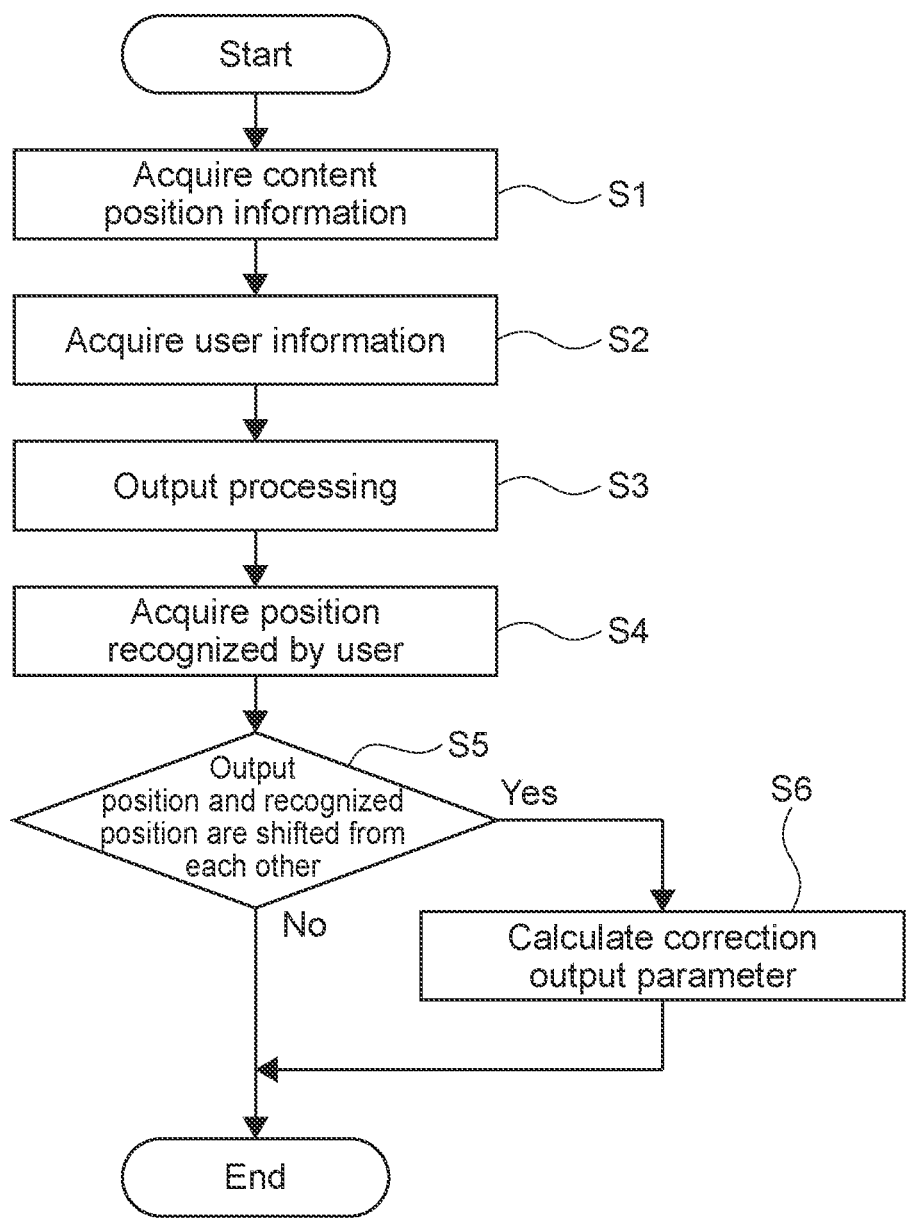
FIG. 5 is a flowchart for describing a calibration method for the sound image localization processing of the information processing apparatus.

FIG. 5 is a flowchart of a series of processing related to the calibration. The series of processing will be described below according to the flowchart of FIG. 5 with reference to FIGS. 3 and 4.

In this embodiment, it is assumed that the user U recognizes that the position of the virtual sound source is deviated and can select the execution of the calibration. When the execution of the calibration is selected by the user U, the processing related to the calibration is started.

As shown in FIG. 5, first, the content information acquisition unit 42 acquires sound content from the storage unit 8 (S1). The sound content includes sound image data.

Next, the user HRTF information acquisition unit 43 acquires the head-related transfer function of the user U measured in advance, as user information, from the storage unit 8 (S2).

Next, the output parameter calculation unit 44 calculates the output parameter of the virtual sound source 11 at the first position P1 of the stereophonic sound space V around the user U by using the sound image data and the head-related transfer function. The output processing unit 45 generates the sound to be output according to the calculated output parameter.

As shown in FIG. 3, the generated sound is output to the speaker 6 (S3) and is output toward the user U. The user U listens to the sound output toward the user U.

Here, when the HMD 1 is worn without any deviation from the wearing position of the HMD 1 at the time of acquiring the head-related transfer function, the user U who listens to the output sound recognizes that the sound is output from the virtual sound source 11 at the first position P1.

On the other hand, when there is a deviation in the wearing position, the user U recognizes that the sound comes from the virtual sound source at a position different from the first position P1. FIG. 4 shows an example in which the sound is recognized as a sound from a virtual sound source located at a position different from the first position P1.

As shown in FIG. 4, the user U points to the position of the recognized virtual sound source 12 recognized as the sound source of the heard sound with the finger while lifting the arm. The second position P2 of the recognized virtual sound source 12 is located in the direction pointed to by the user U.

The image analysis unit 48 acquires the distance information of the hand region of the user U and the plane position of the hand region on the captured image by using the captured image, in which the surroundings of the user U including the hand of the user U appear, which is captured by the outward camera 20.

Further, the position acquisition unit 47 acquires the position information of the HMD 1.

The user-recognized-position acquisition unit 49 acquires the relative position information between the HMD 1 and the hand region of the user U from the distance information of the hand region of the user U and the planar position of the hand region.

In addition, the user-recognized-position acquisition unit 49 acquires the spherical coordinates of the hand region from the relative position information between the HMD 1 and the hand region of the user U and the position information of the HMD 1 acquired by the position acquisition unit 47 (S4).

The spherical coordinates of the hand region includes information on the direction of the second position P2 at which the recognized virtual sound source 12 is located when seen from the HMD 1 (the user U), and is information on the position recognized by the user.

Next, the comparison unit 50 compares the first position with the second position, and calculates the amount of deviation between the first position and the second position (hereinafter, referred to as an offset value in some cases). Depending on whether or not the offset value is equal to or larger than the threshold, it is determined whether or not the first position and the second position are shifted from each other, i.e., whether or not the output coordinates of the virtual sound source 11 output by the HMD 1 and the perceptual coordinates of the position recognized by the user U as the virtual sound source are shifted from each other (S5). In the calculation of the offset value, offset values in each of the declination $\theta$ and the declination $\varphi$ indicating the direction as viewed from the user U are calculated.

If the offset value is lower than the threshold value (S5), it is determined that there is no deviation (No), and a series of processing related to the calibration ends.

If the offset value is equal to or larger than the threshold value in S5, it is determined that there is a deviation (Yes), and the processing proceeds to S6.

In S6, the output parameter calculation unit 44 calculates the correction output parameter on the basis of a result of the comparison by the comparison unit 50. Specifically, the correction output parameter is calculated so as to correct each of the deviations in the declination $\theta$ and the declination $\varphi$.

If it is determined in S5 that there is a deviation, the processing of S1 to S6 is repeated by changing the coordinate position of the first position, and the calculation of the second position and the calculation of the correction output parameter are performed for each of the different coordinate positions.

A final correction output parameter of the sound to be output toward the user U is then calculated on the basis of a plurality of correction output parameters obtained for each of the plurality of first positions having mutually different coordinate positions.

Subsequently, the output processing unit 45 generates the sound according to the correction output eventually calculated and outputs it toward the user U from the speaker 6.

Such a series of processing only needs to be performed one or more times, in which the information of the second position of the recognized virtual sound source, which is recognized as the position of the sound source by the user U who listened to the sound from the virtual sound source located at the first position using the head-related transfer function measured in advance, is acquired, and the correction output parameter is calculated on the basis of a result of the comparison between the first position and the second position. As the number of times the calibration is performed increases, the accuracy of the calibration is improved more.

Note that the example in which the processing of S1 to S6 is performed a plurality of times by changing the coordinate position of the first position at which the virtual sound source is located has been described here, but the virtual sound source located at the first position may be a moving sound source.

In this case, the virtual sound source located at the first position moves continuously. When the user U who has listened to the sound from the continuously moving virtual sound source follows the position recognized as the position of the sound source while pointing to the position with the finger, the continuous linear second position is acquired.

In the example in which the processing of S1 to S6 is performed a plurality of times by changing the coordinate position of the first position at which the virtual sound source is located, the virtual sound source is a fixed virtual sound source fixed to a point, and the first position and the second position are dots. In contrast to this, in the example of the moving sound source, the virtual sound source is a sound source moving on a certain line, and the first position and the second position are linear.

Using the moving sound source as described above allows a plurality of pieces of second position information to be obtained at a time and allows the processing time to be shortened.

As described above, in the information processing system of this embodiment, when the user feels a deviation of the stereophonic localization, the information of the position (second position) of the virtual sound source recognized by the user is acquired using the sensor information of the sensor unit mounted in the HMD, the deviation between the position (first position) presented by the system side and the recognized position (second position) recognized by the user is calculated, and this deviation is corrected. Therefore, it is possible to easily calibrate the sound image localization processing without remeasuring the head-related transfer function.

In each of the embodiments to be described below, the configurations similar to those of the first embodiment are denoted by similar reference symbols, descriptions thereof will be omitted in some cases, and different configurations will be mainly described.

Second Embodiment

In the embodiment described above, the detection result of the hand region is used to obtain the information of the second position, but the present technology is not limited thereto. For example, the information of the second position may be acquired when the user grips with the hand a device such as a controller including a light emitting unit or the like functioning as a tracking marker, aims the device to a position recognized as a sound source, and detects the position of the tracking marker of the device.

Further, in the embodiment described above, the analysis result of the captured image captured by the outward camera 20 of the HMD 1 is used to acquire the information of the second position, but an analysis result of a captured image captured by an external observation camera capable of capturing an image of a user of an apparatus other than HMD 1 or an image around the user may be used.

Hereinafter, a state of acquiring the information of the second position in this embodiment will be described with reference to FIG. 8.

Figure 8:
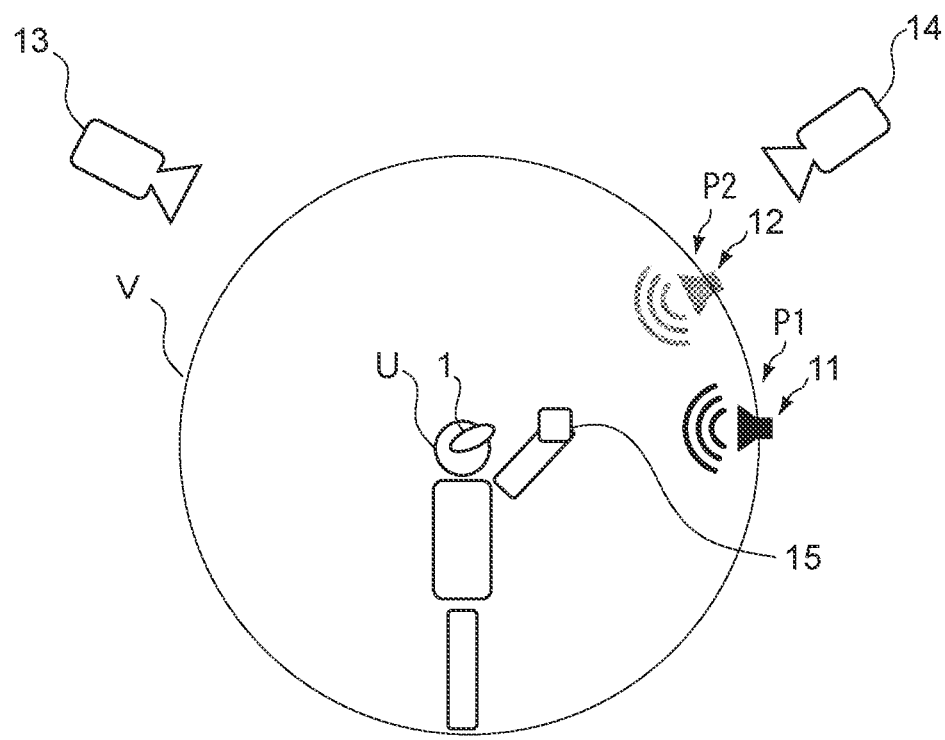
FIG. 8 is a diagram for describing a calibration method for sound image localization processing of an information processing apparatus according to a third embodiment.

FIG. 8 is a diagram showing a state in which the user U wears the HMD 1, listens to a sound output from a virtual sound source, and points to a position recognized by the user U as a sound source.

In FIG. 8, the user U grips a hand controller 15 as a device having a tracking marker in the hand. External observation cameras 13 and 14 for capturing an image of the space around the user U are provided above the head of the user U, for example. Note that an example in which two external observation cameras are installed has been described for convenience here, but the number of external observation cameras is not limited to this. The external observation cameras 13 and 14 are external sensors that acquire information regarding the user and the surroundings of the user as captured images.

As shown in FIG. 8, the sound from the virtual sound source 11 located at the first position P1 in the space around the user U, which has been subjected to the sound image localization processing using the head-related transfer function of the user U measured in advance, is output from the speaker 6 of the HMD 1 toward the user U.

The user U listens to the output sound and aims the hand controller 15 gripped in the hand to the recognized virtual sound source 12 located at the second position P2 recognized as the position of the sound source. The external observation cameras 13 and 14 each capture an image of the user U including the hand controller 15. The captured image is acquired by the sensor information acquisition unit 41 as in the first embodiment.

The position information of the hand controller 15, that is, the position information of the hand is acquired by detecting the tracking marker by the image analysis unit 48 using the captured images, which are captured by the external observation cameras 13 and 14 and on which the hand controller 15 appears. Further, the image analysis unit 48 acquires the position information of the HMD 1 using the captured images captured by the external observation cameras 13 and 14.

The user-recognized-position acquisition unit 49 acquires the relative position information between the HMD 1 and the hand controller 15 from the position information of the hand controller 15 and the position information of the HMD 1 acquired by the image analysis unit 48.

Further, the user-recognized-position acquisition unit 49 acquires the spherical coordinates of the hand region from the relative position information between the HMD 1 and the hand region of the user U and the position information of the HMD 1 acquired by the position acquisition unit 47. The spherical coordinates of the hand region include the information of the second position P2, and more specifically, the information on the direction of the second position P2 at which the recognized virtual sound source 12 is located when seen from the HMD 1 (the user U).

As described above, the information of the second position P2 may be acquired using the hand controller having a tracking marker and the external observation cameras.

Further, the position information of the second position can also be obtained by detecting the hand region of the user U not using a device such as a remote controller or a hand controller having a tracking marker but using the captured images captured by the external observation camera 13 and 14.

Further, the position of the hand may be acquired using, other than the device having a tracking marker, a device such as a hand controller or a remote controller, which includes a positioning unit and is configured to be capable of being gripped by the user U, and using a result of the positioning by the positioning unit of the device.

In this case, the positioning result by the positioning unit of the device is acquired by the sensor information acquisition unit 41. Then, the user-recognized-position acquisition unit 49 acquires the relative position information between the device and the HMD 1, i.e., the relative position information between the HMD 1 and the hand gripping the device, on the basis of the positioning result by the positioning unit of the device and the positioning result by the positioning unit 26 of the HMD 1. The information of the second position P2 may be acquired using such relative position information.

In the case of using the respective positioning results by the positioning unit 26 mounted in the HMD 1 and the positioning unit mounted in the device capable of being gripped by the user, the information of the second position P2 can be acquired without using the captured images captured by the outward camera, the external observation cameras, and the like.

Further, a device that is configured to be capable of being gripped by the user U and includes an acceleration sensor may be used to acquire the position information of the hand of the user U gripping the device by the inertial navigation using the detection result of the acceleration sensor.

Third Embodiment

In the first embodiment, the captured image captured by the outward camera 20 is used to acquire the information of the second position P2, but the information of the second position P2 may be acquired using the captured image captured by the inward camera 21.

As described above, the line of sight of the user can be specified from the captured image of the user's eye captured by the inward camera 21. That is, by specifying the line of sight of the user U using the captured image of the state of the user U gazing at the second position P2, it is also possible to obtain, as the information of the second position P2, the information of the direction of the second position P2 at which the recognized virtual sound source 12 is located when seen from the HMD 1 (the user U).

In this embodiment, it is unnecessary for the user U to point to the position of the recognized virtual sound source 12 with a finger, and it is unnecessary to use a device such as a remote controller or a hand controller that can be gripped by a hand and is used for detecting the position of the hand.

Fourth Embodiment

In the embodiments described above, the information of the second position, which is recognized as the sound source and pointed to with the finger by the user U who has listened to the sound output from the virtual sound source located at the first position, is acquired to calculate the amount of deviation between the first position and the second position, but the present technology is not limited thereto. Other embodiments will be described below.

Figure 9:
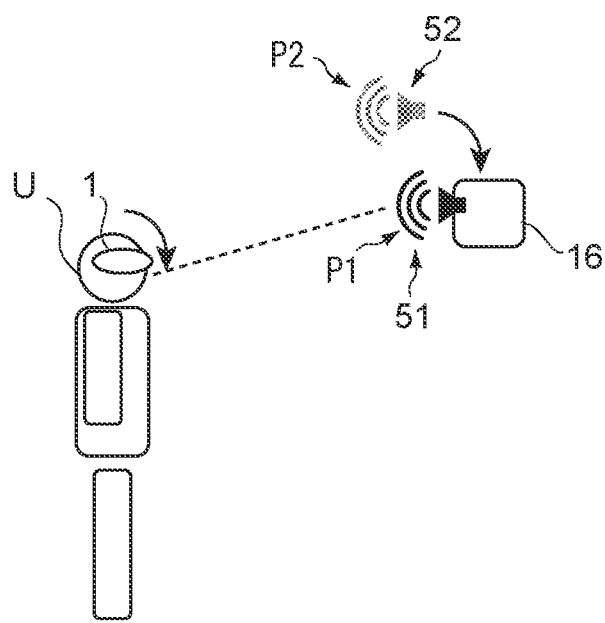
FIG. 9 is a diagram for describing a calibration method for sound image localization processing of an information processing apparatus according to a fourth embodiment.

FIG. 9 is a diagram showing a state in which the user U wearing the HMD 1, listening to a sound output from a virtual sound source, and viewing a position that the user U recognizes as a sound source, moves the line of sight to a position of an object 16 serving as a target. The object 16 is an object fixed to the stereophonic sound space V and may be a real object or a virtual object.

When there is no wearing deviation of the HMD 1, the user U recognizes that a virtual sound source 51 is located at the position of the object 16 located at the first position P1.

In the case shown in FIG. 9, there is a wearing deviation of the HMD 1, and thus the user U recognizes that the sound output from the virtual sound source 51, which is originally supposed to be at the position of the object 16, is a sound output from a recognized virtual sound source 52 located at the second position P2.

The user U listens to the sound and focuses the line of sight on the recognized virtual sound source 52 that user U recognizes as a sound source. The user U them moves the line of sight to the object 16.

The direction of the line of sight of the user U is specified by the image analysis unit 48 using the captured image captured by the inward camera 21, and the trajectory of the movement of the line of sight can be calculated.

The amount of deviation (offset value) between the first position and the second position is calculated from the change in the direction of the line of sight of the user U specified by the image analysis unit 48. Then, as in the embodiments described above, the output parameter is calculated so as to correct the amount of deviation, and a sound is generated in accordance with the calculated output parameter.

Fifth Embodiment

In the above embodiments, the example in which the calibration processing is started by the selection of the user U has been described, but the calibration processing may be configured to be automatically started by the detection result of the posture information by the posture acquisition unit 46 as a trigger, or to prompt the user U to select the start of the calibration.

Using the posture information of the posture acquisition unit 46, the fact that the HMD 1 is tilted, that is, the wearing deviation occurs may be detected on the basis of not only the detection result of the outward camera 20 but also, for example, the detection result of the acceleration sensor 24.

The detection of the wearing deviation of the HMD 1 by the posture information of the posture acquisition unit 46 may be a trigger to automatically start the calibration processing or prompt the user U to select the start of the calibration.

Further, the fact that the direction of the head of the user U detected by the posture information of the posture acquisition unit 46 is not matched with the position of the virtual sound source presented by the information processing system 10 may be a trigger.

That is, when the direction of the head of the user U listening to a sound output from a certain virtual sound source is not matched with the position of the virtual sound source presented by the information processing system 10, it is assumed that the wearing deviation occurs.

In such a case, the detection of the mismatching between the direction of the head of the user U and the position of the virtual sound source may be a trigger to automatically start the calibration processing or to prompt the user U to select the start of the calibration.

Further, when the deviation of the tilt or direction of the head of the user U is detected, it may be configured to automatically perform the calibration processing at any time.

As described above, whether or not the control of the position of the virtual sound source of the sound based on the comparison result in the comparison unit is to be executed, that is, whether or not a series of processing related to the calibration processing is to be executed may be determined on the basis of the posture information acquired by the posture acquisition unit 46.

Sixth Embodiment

In each of the embodiments described above, after the calibration processing, whether to generate a sound according to the output parameter before the calibration or according to the output parameter after the calibration may be configured to be selectable by the user U.

For example, there may be a case where the sound generated according to the output parameter before the calibration processing is not uncomfortable for the user, rather than the sound generated according to the output parameter after the calibration processing.

Therefore, after the calibration processing, a screen for selecting the sound before the calibration processing or the sound after the calibration processing may be displayed on the display unit 5. The user U can select one of the output parameters by the operation input unit 3 while viewing the screen.

OTHER EMBODIMENTS

The embodiments of the present technology are not limited to the embodiments described above, and various modifications may be made without departing from the scope of the present technology.

For example, in the embodiments described above, the AR display that is an extended expression for the real world is taken as an example, but the AR display can also be applied to the VR display using a virtual expression (virtual reality expression, VR expression) that differs from the extended expression for the real world, and the MR (Mixed Reality) display that combines the real world and a virtual world artificially created by CGs or the like.

Further, in each of the embodiments described above, the example has been described in which the information of the second position is acquired using the captured image of the outward camera 20, the captured image of the inward camera 21, the captured images of the external observation cameras 13 and 14, the positioning information from the device including the positioning unit and configured to be capable of being gripped by the user, the captured image including the device having the tracking marker and configured to be capable of being gripped by the user, and the like, but the information of the second position may be acquired by combining them.

Further, as described above, the information processing system according to the present technology includes a controller that executes a series of processing related to calibration of sound image localization processing, a sensor unit, and a sound output unit.

In the embodiments described above, the example of the HMD capable of outputting not only a sound but also a video has been given as the sound output apparatus including the sound output unit, but the sound output apparatus may include at least a sound output unit such as a speaker for outputting a sound to the user. The sound output unit is located in the vicinity of the ear of the user when the user wears the sound output apparatus.

For example, the sound output apparatus may be achieved by a wearable device of a headphone type without a display as a display unit, a neckphone type (which is a neck-hanging type with or without a display), or the like.

The sensor unit is typically provided in the sound output apparatus, but a part of the sensor unit may be provided in an apparatus different from the sound output apparatus. For example, as in the second embodiment described above, an external observation camera serving as an external sensor for acquiring information of the user and the surroundings of the user may be provided separately from the sound output apparatus.

The sensor unit does not need to include all of the various sensors included in the sensor unit 2 described in the embodiments described above and only needs to have any sensor configuration capable of acquiring the position information of the position (the second position) recognized by the user who has listened to the sound as the sound source, the position information of the HMD (the position information of the user), and the posture information of the HMD 1.

The controller that executes the series of processing related to the calibration may be provided in the sound output apparatus, or may be provided in another apparatus such as a cloud server or a portable terminal that can communicate with the sound output apparatus.

Note that the present technology may take the following configurations.

(1) An information processing apparatus, including:
an output processing unit that generates a sound by using a head-related transfer function of a user measured in advance, the sound being to be output from a virtual sound source located at a first position in a space around the user;
a recognized-position acquisition unit that acquires information of a second position in the space, the second position being recognized as a position of the virtual sound source by the user who has listened to the sound; and
a comparing unit that compares the first position and the second position with each other,
in which the output processing unit controls the position of the virtual sound source of the sound output toward the user on the basis of a result of the comparison by the comparing unit.

(2) The information processing apparatus according to (1), in which
the output processing unit controls, using the head-related transfer function, a plurality of sounds to be output from a plurality of the virtual sound sources located at a plurality of the first positions having coordinate positions different from each other, and
the recognized-position acquisition unit acquires information of a plurality of the second positions recognized as positions of the virtual sound sources of the respective sounds by the user who has listened to the plurality of sounds.

(3) The information processing apparatus according to (1), in which
the virtual sound source is a moving sound source.

(4) The information processing apparatus according to any one of (1) to (3), further including an output parameter calculation unit that calculates an output parameter of the sound output toward the user on the basis of the result of the comparison by the comparing unit, in which
the output processing unit controls the position of the virtual sound source of the sound output toward the user in accordance with the output parameter calculated by the output parameter calculation unit.

(5) The information processing apparatus according to (4), in which
the output parameter calculation unit calculates the output parameter to correct a deviation between the first position and the second position.

(6) The information processing apparatus according to (5), in which
the sound controlled by the output processing unit is supplied to a sound output unit of a sound output apparatus, the sound output unit being located in a vicinity of an ear of the user when the sound output apparatus is worn by the user.

(7) The information processing apparatus according to (6), in which
the sound output apparatus includes a sensor unit that detects information regarding the user and surroundings of the user, and
the recognized-position acquisition unit acquires information of the second position by using sensor information from the sensor unit.

(8) The information processing apparatus according to (7), in which
the sensor unit includes a first imaging unit that captures an image of the surroundings of the user, and
the recognized-position acquisition unit acquires the information of the second position by using a captured image captured by the first imaging unit and showing a state in which the user points to the second position.

(9) The information processing apparatus according to (7) or (8), in which
the sensor unit includes a second imaging unit that captures an image of an eye of the user, and
the recognized-position acquisition unit acquires the information of the second position by using a captured image captured by the second imaging unit and showing a state in which the user gazes at the second position.

(10) The information processing apparatus according to any one of (7) to (9), further including
a posture acquisition unit that acquires posture information of the sound output apparatus by using the sensor information from the sensor unit, in which
whether or not control of the position of the virtual sound source of the sound based on the result of the comparison is to be executed is determined on the basis of the posture information.

(11) The information processing apparatus according to any one of (6) to (10), in which
the recognized-position acquisition unit acquires information of the second position by using a captured image captured by an external sensor different from the sound output apparatus and showing a state in which the user points to the second position.

(12) The information processing apparatus according to (11), in which
the recognized-position acquisition unit acquires the information of the second position by using a captured image captured by the external sensor and including a device to be gripped by the user.

(13) The information processing apparatus according to any one of (6) to (12), in which the recognized-position acquisition unit acquires information of the second position by using a positioning result of a device including a positioning unit to be gripped by the user.

(14) The information processing apparatus according to any one of (1) to (13), in which the output parameter calculation unit calculates the output parameter on the basis of a result of selecting the first position or the second position for the virtual sound source selected by the user.

(15) An information processing method, including:

generating a sound by using a head-related transfer function of a user measured in advance, the sound being to be output from a virtual sound source located at a first position in a space around the user;

acquiring information of a second position in the space, the second position being recognized as a position of the virtual sound source by the user who has listened to the sound;

comparing the first position and the second position with each other; and controlling the position of the virtual sound source of the sound output toward the user on the basis of a result of the comparison.

(16) A program for causing an information processing apparatus to execute processing including:

generating a sound by using a head-related transfer function of a user measured in advance, the sound being to be output from a virtual sound source located at a first position in a space around the user;

acquiring information of a second position in the space, the second position being recognized as a position of the virtual sound source by the user who has listened to the sound;

comparing the first position and the second position with each other; and controlling the position of the virtual sound source of the sound output toward the user on the basis of a result of the comparison.

(17) An information processing system, including:

an output processing unit that generates a sound by using a head-related transfer function of a user measured in advance, the sound being to be output from a virtual sound source located at a first position in a space around the user;

a recognized-position acquisition unit that acquires information of a second position in the space, the second position being recognized as a position of the virtual sound source by the user who has listened to the sound;

a comparing unit that compares the first position and the second position with each other; and a sound output unit that outputs the sound controlled by the output processing unit toward the user, in which the output processing unit controls the position of the virtual sound source of the sound output toward the user on the basis of a result of the comparison by the comparing unit.

REFERENCE SIGNS LIST 1 head-mounted display (information processing apparatus, sound output apparatus)
2 sensor unit
6 speaker (sound output unit)
10 information processing system
11 virtual sound source located at first position
12 recognized virtual sound source (virtual sound source located at second position)
13, 14 external observation camera (external sensor)
15 hand controller (device)
20 outward camera (first imaging unit)
21 inward camera (second imaging unit)
44 output parameter calculation unit
45 output processing unit
49 user-recognized-position acquisition unit (recognized-position acquisition unit)
50 comparing unit
P1 first position
P2 second position
U user
V stereophonic sound space (space around user)

The invention claimed is:

1. An information processing apparatus, comprising:
circuitry configured to:
generate a sound based on a head-related transfer function of a user, wherein the sound is output toward the user from a virtual sound source located at a first position in a space around the user;
acquire information of a second position of the virtual sound source in the space, wherein the second position is recognized by the user who has listened to the sound;
compare the first position with the second position;
calculate, based on a result of the comparison, an output parameter of the sound output toward the user; and
control the first position of the virtual sound source of the sound based on the output parameter.

2. The information processing apparatus according to claim 1, wherein the circuitry is further configured to:
generate, based on the head-related transfer function, a plurality of sounds to be output from a plurality of virtual sound sources located at a plurality of first positions in the space, wherein
a coordinate position of the first position of the plurality of first positions is different from a coordinate position of a third position of the plurality of first positions, and
the plurality of virtual sound sources includes the virtual sound source; and
acquire information of a plurality of second positions of the plurality of virtual sound sources of the plurality of sounds, wherein
the plurality of second positions includes the second position, and
the plurality of second positions is recognized by the user who has listened to the plurality of sounds.

3. The information processing apparatus according to claim 1, wherein the virtual sound source is a moving sound source.

4. The information processing apparatus according to claim 1, wherein the circuitry is further configured to calculate the output parameter to correct a deviation between the first position and the second position.

5. The information processing apparatus according to claim 4, further comprising a sound output apparatus, wherein
the sound generated by the circuitry is output to a speaker of the sound output apparatus, and
the speaker is located in a vicinity of an ear of the user in a case where the sound output apparatus is worn by the user.

6. The information processing apparatus according to claim 5, wherein the sound output apparatus includes a sensor configured to:
  detect information regarding the user and information regarding surroundings of the user; and
  acquire the information of the second position based on at least one of the information regarding the user or the information regarding the surroundings of the user.

7. The information processing apparatus according to claim 6, wherein
  the sensor includes a first camera configured to capture an image of the surroundings of the user,
  the captured image shows a state in which the user points to the second position, and
  the circuitry is further configured to acquire the information of the second position based on the captured image captured by the first camera.

8. The information processing apparatus according to claim 6, wherein
  the sensor includes a second camera configured to capture an image of an eye of the user,
  the captured image shows a state in which the user gazes at the second position, and
  the circuitry is further configured to acquire the information of the second position based on the captured image captured by the second camera.

9. The information processing apparatus according to claim 6, wherein the circuitry is further configured to:
  acquire posture information of the sound output apparatus based on the information regarding the surroundings of the user; and
  control the first position of the virtual sound source of the sound based on the posture information.

10. The information processing apparatus according to claim 5, wherein
  the circuitry is further configured to acquire the information of the second position based on a first captured image captured by an external sensor different from the sound output apparatus, and
  the first captured image shows a state in which the user points to the second position.

11. The information processing apparatus according to claim 10, wherein
  the circuitry is further configured to acquire the information of the second position based on a second captured image captured by the external sensor, and
  the second captured image includes a device to be gripped by the user.

12. The information processing apparatus according to claim 5, wherein
  the circuitry is further configured to acquire the information of the second position based on a positioning result of a device to be gripped by the user, and
  the device includes a positioning unit that outputs the positioning result.

13. The information processing apparatus according to claim 6, wherein
  the circuitry is further configured to calculate the output parameter based on a result of selection of one of the first position or the second position, and the one of the first position or the second position is selected by the user for the virtual sound source.

14. An information processing method, comprising:
  generating a sound based on a head-related transfer function of a user, wherein the sound is output toward the user from a virtual sound source located at a first position in a space around the user;
  acquiring information of a second position of the virtual sound source in the space, wherein the second position is recognized by the user who has listened to the sound;
  comparing the first position with the second position;
  calculating, based on a result of the comparison, an output parameter of the sound output toward the user; and
  controlling the first position of the virtual sound source of the sound based on the output parameter.

15. An information processing apparatus, comprising:
  circuitry configured to:
    generate, based on a head-related transfer function, a plurality of sounds to be output from a plurality of virtual sound sources located at a plurality of first positions in a space around a user, wherein
      coordinate positions of the plurality of first positions is different from one another, and
      the plurality of virtual sound sources includes a virtual sound source located at a first position of the plurality of first positions;
    acquire information of a plurality of second positions of the plurality of virtual sound sources of the plurality of sounds, wherein
      the plurality of second positions includes a second position of the virtual sound source, and
      the plurality of second positions is recognized by the user who has listened to the plurality of sounds;
    compare the first position with the second position; and
    control the first position of the virtual sound source of a sound based on a result of the comparison.

16. An information processing method, comprising:
  generating, based on a head-related transfer function, a plurality of sounds to be output from a plurality of virtual sound sources located at a plurality of first positions in a space around a user, wherein
    coordinate positions of the plurality of first positions is different from one another, and
    the plurality of virtual sound sources includes a virtual sound source located at a first position of the plurality of first positions;
  acquiring information of a plurality of second positions of the plurality of virtual sound sources of the plurality of sounds, wherein
    the plurality of second positions includes a second position of the virtual sound source, and
    the plurality of second positions is recognized by the user who has listened to the plurality of sounds;
  comparing the first position with the second position; and
  controlling the first position of the virtual sound source of a sound based on a result of the comparison.

* * * * *